(12) United States Patent
Pelaez, Jr. et al.

(10) Patent No.: US 7,532,956 B1
(45) Date of Patent: May 12, 2009

(54) DISTRIBUTED POWER AND PROTECTION SYSTEM

(76) Inventors: Pedro Pelaez, Jr., 11960 NW. 87 Ct., Hialeah Gardens, FL (US) 33018-1912;
Mel Sequeira, 11960 NW. 87 Ct., Hialeah Gardens, FL (US) 33018-1912;
Mark Gropper, 11960 NW. 87 Ct., Hialeah Gardens, FL (US) 33018-1912

( * ) Notice: Subject to any disclaimer, the term of this patent is extended or adjusted under 35 U.S.C. 154(b) by 35 days.

(21) Appl. No.: 10/924,413

(22) Filed: Aug. 24, 2004

(51) Int. Cl.
*G05D 17/00* (2006.01)
*G05B 11/01* (2006.01)
*G01R 27/00* (2006.01)
*H02H 3/00* (2006.01)

(52) U.S. Cl. .................... 700/293; 700/21; 702/65; 702/70; 702/73; 361/87; 361/93.2

(58) Field of Classification Search ........ 700/292–294, 700/21, 22, 79, 81, 297–298; 361/79, 87, 361/93.1, 93.2, 93.3, 93.9; 702/57, 63, 64–74, 702/78
See application file for complete search history.

(56) References Cited

U.S. PATENT DOCUMENTS

| | | | | |
|---|---|---|---|---|
| 3,569,785 A | * | 3/1971 | Durbeck et al. | 361/80 |
| 4,203,142 A | * | 5/1980 | Lee | 361/42 |
| 4,466,071 A | * | 8/1984 | Russell, Jr. | 700/293 |
| 4,829,457 A | * | 5/1989 | Russo et al. | 700/293 |
| 4,937,769 A | * | 6/1990 | Verbanets | 702/195 |
| 5,507,943 A | * | 4/1996 | Labrador | 210/136 |
| 5,537,327 A | * | 7/1996 | Snow et al. | 700/293 |
| 6,377,031 B1 | | 4/2002 | Karuppana et al. | 323/220 |
| 6,465,908 B1 | | 10/2002 | Karuppana et al. | 307/31 |
| 6,987,389 B1 | * | 1/2006 | Macbeth et al. | 324/536 |
| 2004/0073390 A1 | * | 4/2004 | Wagner et al. | 702/76 |

* cited by examiner

*Primary Examiner*—Sean P. Shechtman
(74) *Attorney, Agent, or Firm*—Sanchelima & Associates P.A.

(57) ABSTRACT

A power distribution and protection system and method where an electrical power source distributes power to different load circuits and provides protection that changes on the fly as required by sensing the characteristics of the loads. This is accomplished by a central processing node that is connected to multiple point of use nodes. The characteristics over an initial period of time of the current drawn by the loads are detected and compared to references that determine whether a load is inductive, resistive or is in arcing condition. One of the techniques used involves counting the zero crossings over a predetermined period of time. If the voltage applied to the loads is AC, a high pass filter is used to extract the ringing characteristics to be compared.

11 Claims, 7 Drawing Sheets

DISTRIBUTED POWER AND PROTECTION SYSTEM

BACKGROUND OF THE INVENTION

1. Field of the Invention

The present invention relates to a distributed power and protection system, and more particularly, to a system and method for distributing and controlling power of various magnitudes for motorized transportation means such as yachts, trucks, buses, motor coaches, recreational vehicles, tractors, turf and garden equipment, material handlers, generators, compressors, and commercial and residential applications among others.

2. Description of the Related Art

Several designs for distributed and power protection systems have been designed in the past. These systems of protection require that the cognizant engineer have prior knowledge of the loads being driven-their operating ampacity, transient response, and voltage requirements. These system requirements enable the design engineer to select the appropriate over-current protection device for the load being driven. Depending on the type of load being driven, the over-current protection device chosen could be a fuse or a circuit breaker. However, any change in these load requirements would require a complete re-design of the power distribution system and its characteristics. Since some loads, such as motors, require a an in-rush or pulse tolerance at start-up, engineers have to de-rate or modify the trip delay of the circuit breakers, in order to accommodate the characteristics of the motor load. Secondly, to accommodate this higher current rating, they also have to use heavier gauge wire. All this makes for a very inefficient system. None of them, however, provides for the setting of intelligent circuit breakers that are programmed on the fly by sensing the power characteristics of the load. These characteristics of the load can also be displayed automatically. Additionally, the present invention detects reverse polarity. And, finally, the present invention also detects arcing conditions.

Owing to the drawback of conventional methods, it is the object of this invention to introduce an automatic load detection circuit. This circuit will sense the different loads requesting power and automatically configure and adapt to the output transient response, start-up-current, operating current window, and rise time.

Using this concept, engineers can now design in the proper gauge wiring (generally smaller, and lighter) to support the actual operating current requirements of the load.

Current methods of over current protection, which involve the use of electro-mechanical devices such as thermal or magnetic circuit breakers, are designed to detect "dead shorts" in a circuit path before breaking the connection. However, momentary dis-connections, which may be caused by loose electrical hardware, can cause the circuit to arc and melt the wire insulation while remaining un-detected by the thermal or magnetic circuit breakers thereby leading to a hazardous condition. Also owing to this drawback, it is another object of this invention to automatically detect this arcing state and take appropriate action, usually to shut down the offending circuit, and alert appropriate personnel to the condition of that particular output.

Figure 2:
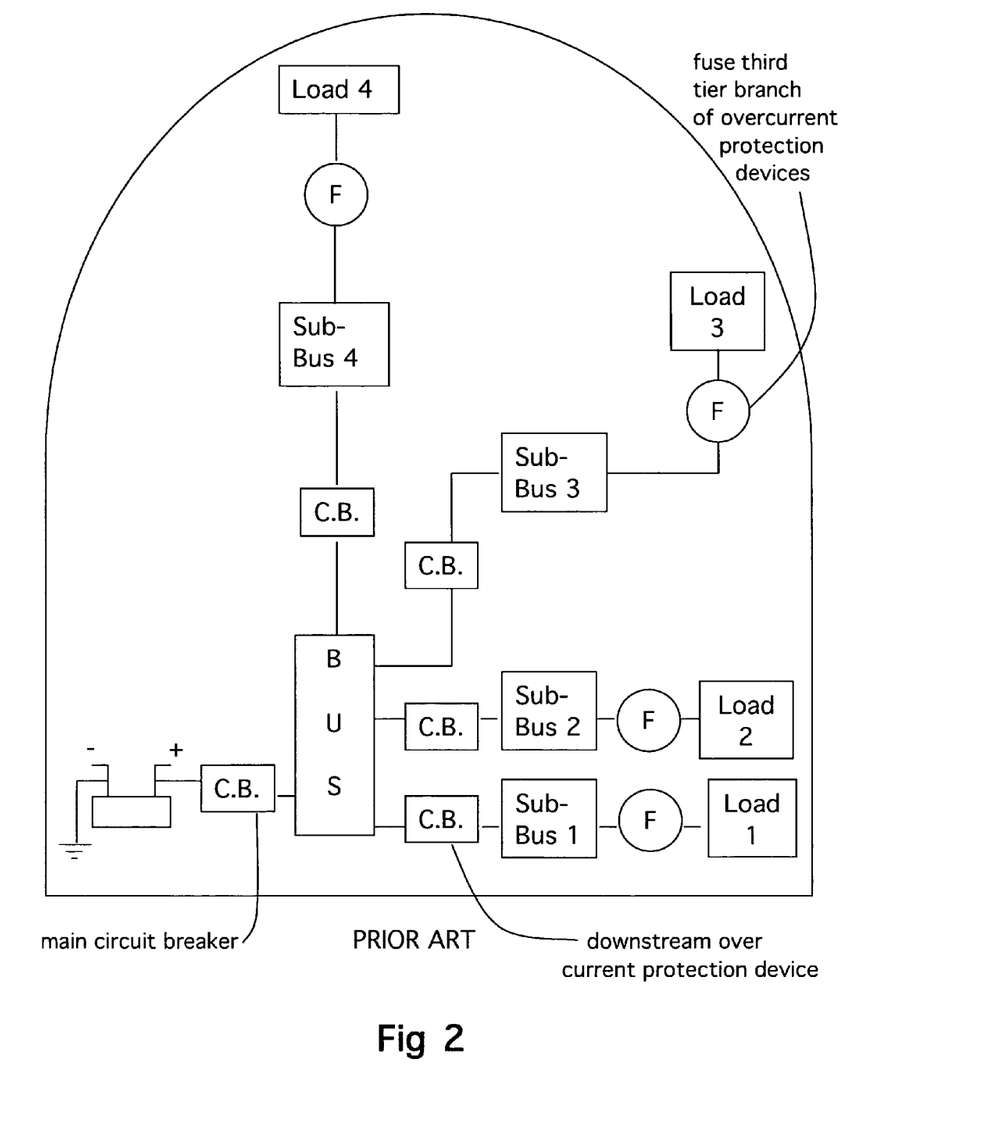
FIG. 2 shows a prior art block representation of a conventional power distribution system.

In electrical power distribution systems, as shown in FIG. 2 of the present application, it is necessary to supply well-regulated and appropriately protected power to a plurality of loads. Such loads may not only be physically located remotely from one another, but may also have voltage and current requirements, which differ markedly from one load to another. To accommodate such loads, it is common to use a single bulk power supply to feed a common bus, which in turn, feeds a plurality of local bus sub-systems. This power supply is designed to provide a very high ampere output, typically 30 to 100 AC Amps or 50 to 500 DC Amps, that is protected by an over current protection device. This main high-powered bus then feeds a plurality of lower ampere-rated secondary bus sub-systems. These sub-systems are further protected by down-stream-over-current protection devices of various current ratings suitable for their appropriate loads being driven. These are fed to a third tier branch of over-current protections devices.

These bus strips and other interconnecting devices are of sufficient thickness so as to reduce voltage drops due to parasitic impedances inherent in interconnecting devices, and to maintain good electrical conductivity for optimum transfer of power.

While the above power distribution design is capable of providing well-regulated output power, it tends to be bulky and adds a significant amount of un-wanted mass to the electrical power distribution system. A more topologically efficient system is described and claimed in the present application.

Another drawback to the existing system is that although the circuit breakers are rated for specific amperage, their actual trip point typically falls anywhere between its rated current-carrying capacity and up to 135% of its rated capacity. Hence, a full load (F.L.) 20 Amp-rated breaker may not break until about 27 Amps is drawn through the circuit. Also, existing methods of protection from fire hazards require the designer to have prior knowledge of the load to be driven (inductive or resistive) in order to incorporate instantaneous or time-delayed over-current protection devices in the system. For instance, supporting a maximum current draw of 27 Amps. requires heavy gauge wiring and interconnecting devices (i.e. connectors) to safely transfer power to the appropriate loads. All this extra hardware adds significantly to the cost and creates a very heavy power distribution panel in the system.

Moreover, connecting these heavy gauge wires and interconnecting devices also adds a significant strain on manufacturing processes, requiring significant additional installation time and manufacturing labor as well as various types of mounting hardware and other secondary operations. Field replacement of the over current protection devices also become cumbersome since several hardware pieces have to be removed in order to un-install them.

The present conventional method uses a centralized wiring architecture wherein all of the power is distributed to the respective loads from a centrally located panel. In some applications, the panel is located in an area that prevents its immediate access. Any fault condition at the panel would require personnel to physically get to the panel to either identify or determine the cause of failure.

Other drawbacks of conventional power distribution systems are that manufacturers have to run long wires from the source of power to the loads. The long wire runs can add a significant amount of impedance thus causing voltage drops typically in excess of 10%. In order to minimize this drop, manufacturers have typically resorted to using very heavy gage wire to lower the impedance thus minimizing voltage drops. This heavy gauge wire routed throughout adds a significant amount of weight and cost.

This also results in additional labor costs and time for installation of this complex wiring structure, which raises manufacturing costs.

Applicant believes that the closest reference to this subject matter claimed herein corresponds to an intelligent power management system as described in Karuppana U.S. Pat. Nos. 6,465,908 and 6,377,031. Karuppana's patents describe systems that seek to avoid a breakdown in DC power sources, which may have limited power capacity, by diagnosing impending failures and cutting power off to targeted devices. However, the Karuppana patents do not address the drawbacks of the current method, which requires long heavy gauge and complex wiring and significant manufacturing costs. Karuppana does not disclose the use of current sensing devices over an initial period of time from the application of a voltage to a load to determine the characteristics (resistive or inductive) of a load. Furthermore, Karuppana does not address the drawbacks of conventional power distribution systems with heavy gauge and complex wiring with significant high manufacturing costs. The present invention, on the other hand, provides for a distributed power system that also provides calibrated protection to the loads, as needed.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an improved distributed electrical power and protection architecture system and method.

It is another object of this invention to apportion and systematically transfer a source of power to points of use in down stream circuits.

It is still another object of the present invention to provide a system and method for programming the characteristics required for each over-current protection device on the fly without requiring a user to have a prior knowledge of the load characteristics.

Another object of this invention is to provide a system that can readily display the load characteristics and simplify the process of displaying or assigning legends for the circuits utilized by the associated loads.

Still another object of the present invention is to provide a system that detects reverse polarity and immediately shuts down output power reporting a fault condition.

It is yet another object of this invention to provide a system with an automatic load detection circuit that senses the different loads requesting power and the load's characteristics (or impedance characteristics) and to program the appropriate output protection characteristics for that load.

Another object of the invention is to simplify wiring topology with the consequent reduction in manufacturing costs.

Another object of this invention is for a system to detect arcing conditions and protect the circuit from them.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
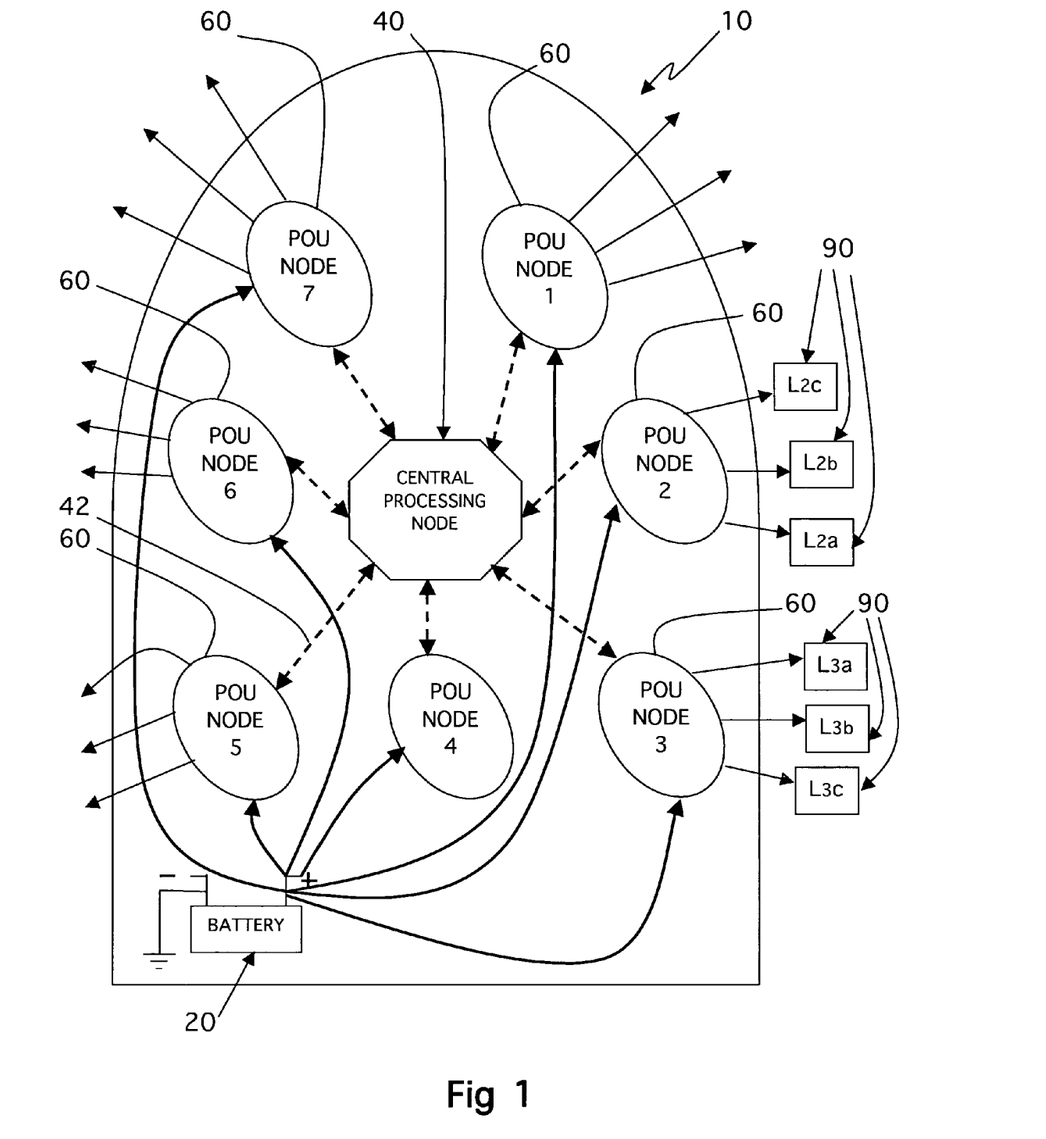
FIG. 1 is a block representation of a typical system incorporating the claimed invention.

Referring now to FIG. 1, where the present invention is generally referred to with numeral 10, it can be observed that it basically includes, in one of the preferred embodiments power source 20, central processing node 40, point of use nodes 60 feeding their respective loads 90.

The electrical power source 20 is typically a battery but other equivalent sources of power can be used including non-DC sources. One of the applications envisioned by the inventors is using the system in a boat or recreational vehicle, as represented in FIG. 1. But there are many other applications. An application with a DC power source 20 will be described first.

Figure 3:
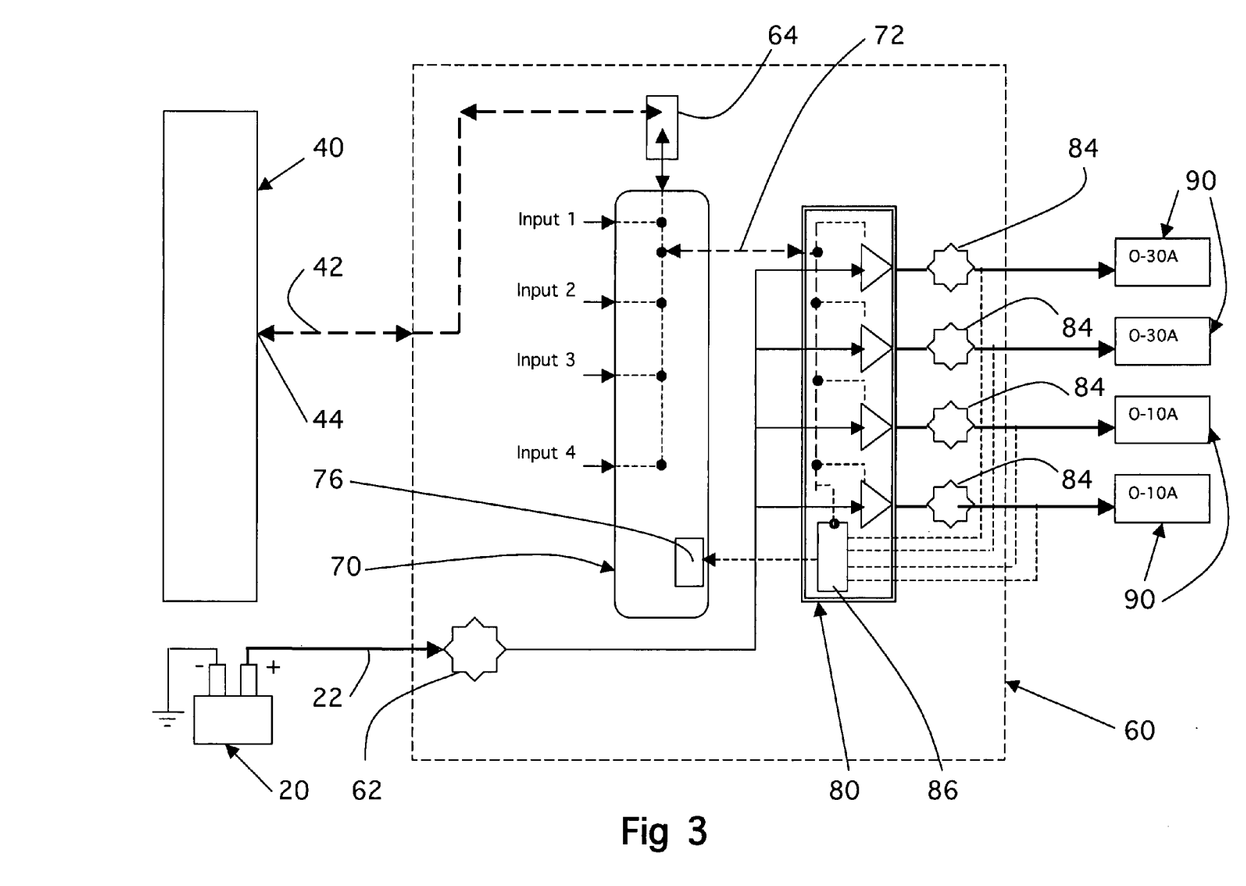
FIG. 3 illustrates a block schematic diagram of a point of use node showing a DC power source connected to its power input.

Central processing node 40 is connected to point of use (POU) nodes 60 with control and data signals being exchanged, as shown in FIG. 1. FIG. 3 shows a block schematic of central processing node 40 and point of use node 60 showing the positive terminal of power source 20 connected to power input 62 with conductor 22. Input/output port 64 is connected with conductors 42 to central processing node 40, at input/output port 44 constituting a communication bus.

Node 60 includes microcontroller 70 for processing the signals received from port 64 and to generate other signals sent out through port 64. Microcontroller 70 can be implemented with Motorola's MC68HC908AP8 integrated circuit or equivalent. Microcontroller 70 controls the operation of intelligent high current switch assembly 80 through serial peripheral interface (SPI) bus 72. Assembly 80 can be implemented, in one of the preferred embodiments, with Motorola 33982 family of power devices. Outputs 84 are connected to associated loads 90.

In operation, the impedance characteristics of loads 90 are sensed by assembly 80 upon the application of power by output 84. Depending upon the transient response detected, micro-controller 70 will determine if the corresponding load 90 is inductive or resistive, the time domain characteristic and ringing effect of the voltage initially indicates the impedance characteristic of the load. If the load is purely resistive, for instance, it may be protected with over-current protection devices that do not require a long delay in their operation. On the other hand, if the load is inductive (such as motors) then a long time delay is typically required.

Figure 4A:
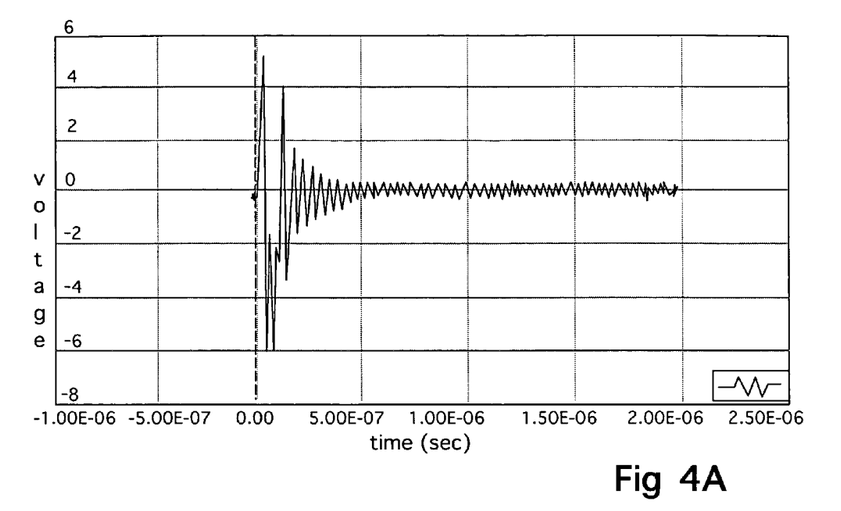
FIG. 4A is a representation of a typical resistive load. The characteristics of the sensed transient response are shown with frequent zero crossings.
Figure 4B:
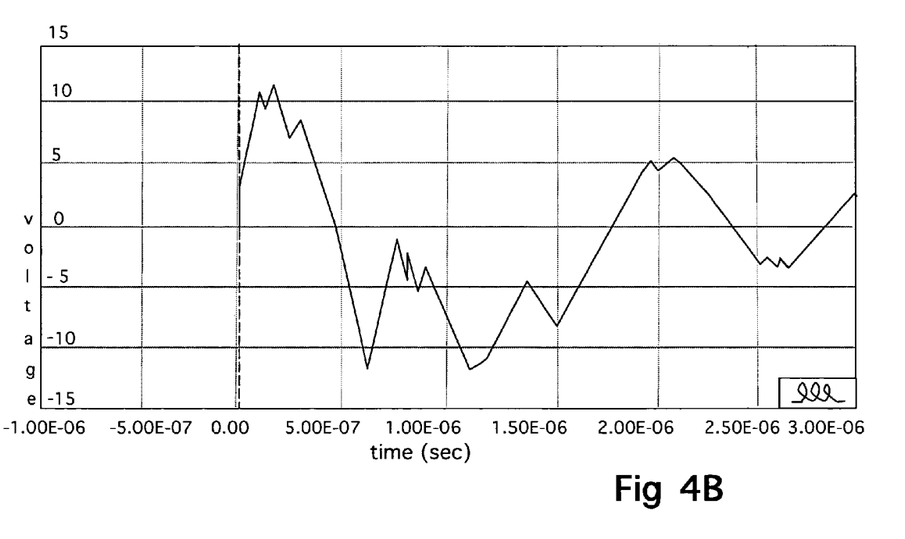
FIG. 4B is a representation of a typical inductive load. The zero crossings are not as frequent over a predetermined period of time, as in FIG. 4A.
Figure 4C:
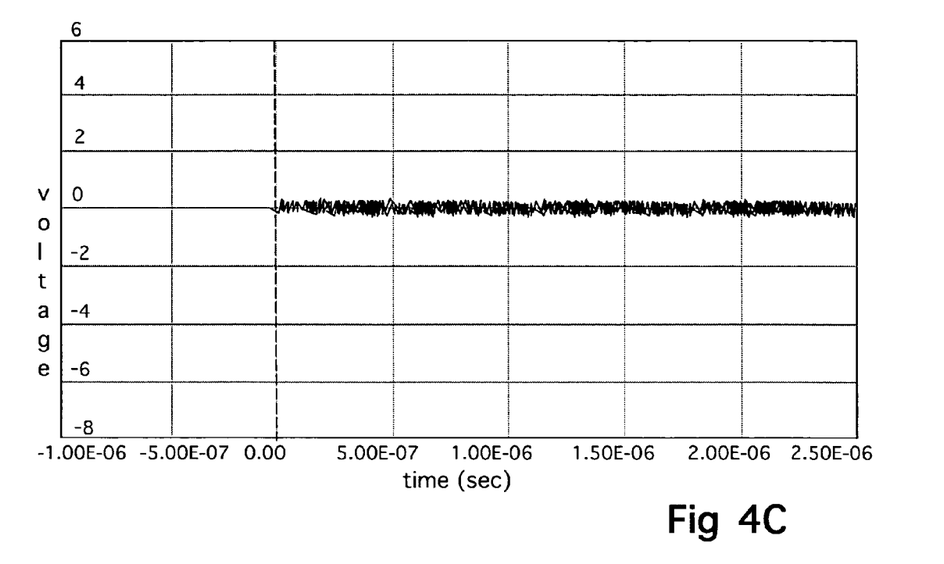
FIG. 4C is a representation of a typical arcing load.

To determine the type of load, the $\delta i/\delta t$ is sampled over a predetermined period of time. Assembly 60 provides the necessary circuitry for sampling the current drawn at programmable intervals of time. This sampling activity creates a sampled digital bit stream, which is a digital image of the analog current waveform going through the load. The digitized image is compared to predetermined references that will distinguish the characteristics shown in FIGS. 4A (resistive load) and 4B (inductive load). One of the techniques that have been successfully used to distinguish these two basic load characteristics is to count the number of zero crossings of the initial ringing or noise observed upon the application of the source voltage over a predetermined period of time. For instance, repetitive sampling (35 times in one of the preferred embodiments) over the first 100 microseconds creates a digital bit stream of values (image) proportional to the load current (actual) and these values go from a maximum positive value to a maximum negative value, or vice versa. A counter is set up for counting the number of zero crossings. If the number of zero crossings is below a predetermined number, then the load is inductive since these zero crossings are spaced farther apart than those of resistive loads. If the number of zero crossings is higher than a predetermined number, then the load is resistive or arcing. The digitized image of an arcing characteristic is shown in FIG. 4C. To differentiate an arcing load from a resistive load, yet another higher count number threshold is used and only those loads that exceed that number will be arcing loads since, by definition, the image values will stay substantially at zero during the entire sampling interval.

Other techniques for distinguishing between the two (or three if arcing is considered) load characteristics exist, but they are more complex or costly to implement. One of these involves sensing or measuring the rising edge of a sampled image of the load current and, for a particular range of time constants associated within typical inductive loads of an application, determine whether it has risen above or below a predetermined percentage of its peak value within a predetermined amount of time. Other similar techniques can be used to distinguish between the two characteristics of load waveforms, but they all include comparing their images against a reference over an initial predetermined interval of time.

Figure 3A:
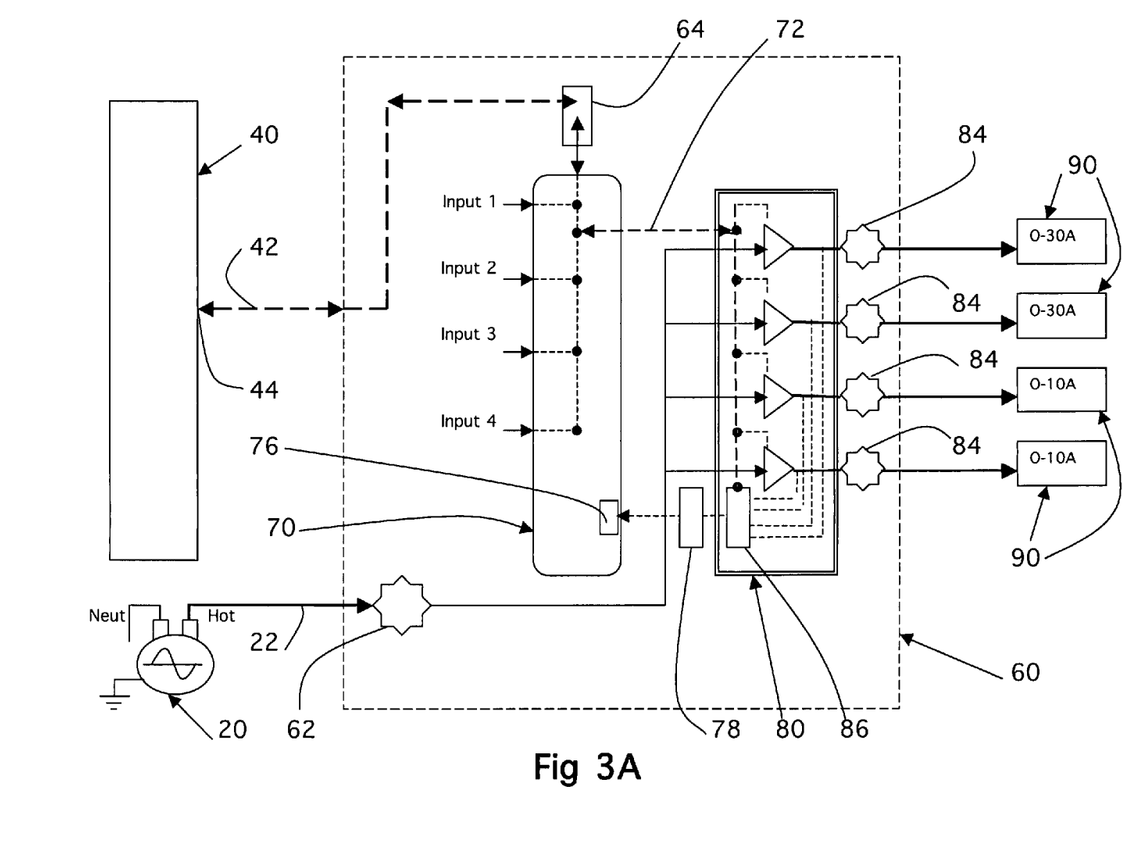
FIG. 3A illustrates a block schematic diagram of a point of use node showing an AC power source connected to its power input.
Figure 5A:
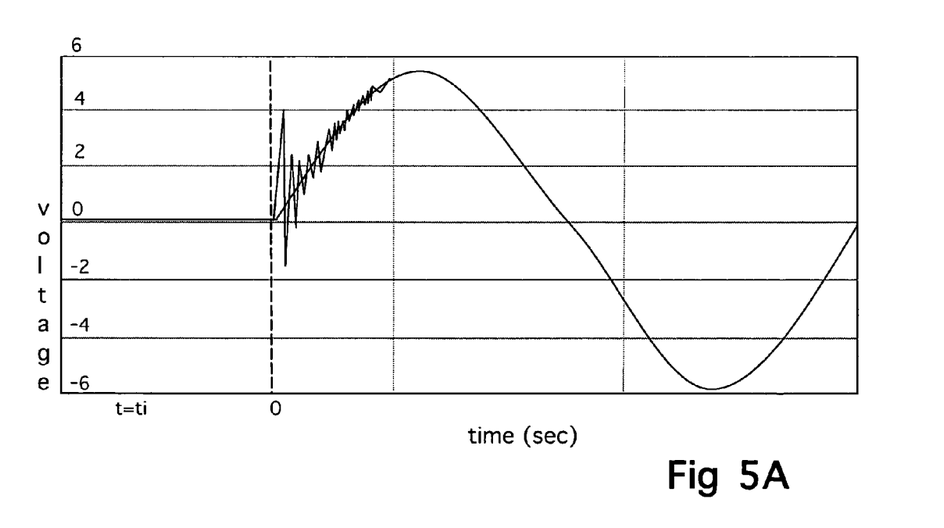
FIG. 5A is a representation of a resistive load, like the one represented in FIG. 4A, excited by an AC voltage. The composite signal is then filtered to extract the load characteristics (noise or ringing) from the AC carrier for comparison and detection of the characteristic content.
Figure 5B:
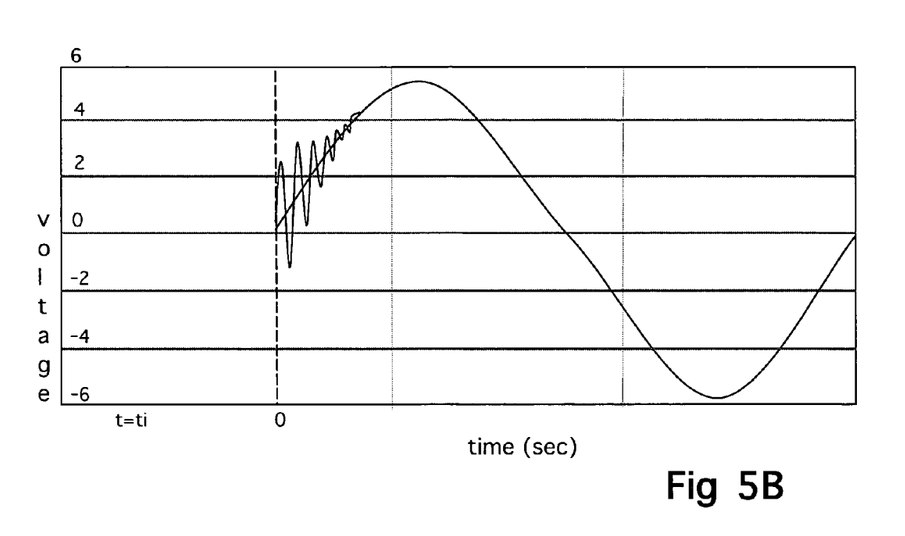
FIG. 5B is a representation of an inductive load, like the one represented in FIG. 4B, excited by an AC voltage. The composite signal is then filtered to extract the load characteristics (noise or ringing) from the AC carrier for comparison and detection of the characteristic content.
Figure 5C:
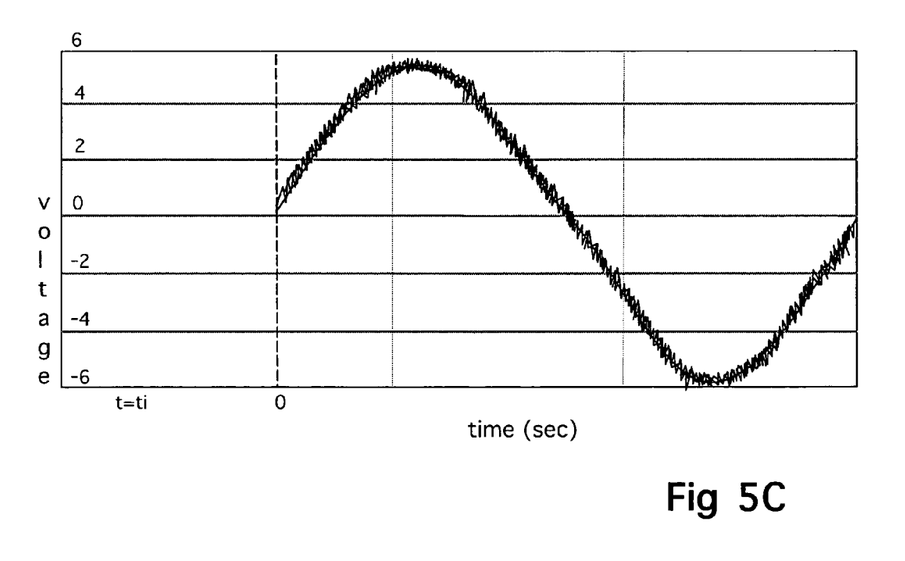
FIG. 5C is a representation of an arcing condition, like the one represented in FIG. 4C. The composite signal is then filtered to extract the load characteristics (noise or ringing) from the AC carrier for comparison and detection of the characteristic content.

The present invention can also be used with AC power sources. For AC power sources a high pass filter (78) is required between output 86 and the sensing current circuitry (microcontroller 70) within assembly 80, as shown in FIG. 3A. A representation of the ringing or noise signal riding on an AC waveform is shown in FIGS. 5A; 5B and 5C.

Microcontroller 70 receives at input 76 the sensed current from output 86 and appropriately sets the output requirements for that load, which may include but not be limited to, operating current window, over-current threshold, output voltage sag, etc. If the limits are exceeded, the pertinent command signals are generated to correct the situation (including shutting off the system if the output deviates from the preset parameters for that load).

Arcing conditions are also detected in a similar manner and are interpreted by microcontroller 70, which in turn causes the offending circuit to shut off and/or to send alarm signals to the central processing node 40.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for distributing electrical power and protecting at least one load, comprising:
   A) an electrical power source;
   B) at least one point of use node including at least one first input voltage means connected to said power source and at least one first output voltage means selectively connected to said first input voltage means and also connected to at least one load capable of selectively drawing electrical current with ringing or noise current caused by said load, each of said at least one point of use node including means for sensing and digitally sampling said ringing and noise current drawn by each of said at least one load over a predetermined initial period of time and including digital means for comparing the time domain characteristics of said sensed and sampled noise and ringing current over said predetermined period of time against pre-established digitized references to determine the impedance characteristics of said loads, and further including means for interrupting the connection between said first input voltage means and said first output voltage means; and
   C) means for controlling said interrupting means in response to the comparison of said pre-established references with values calculated from said sensed noise and ringing current.

2. The system set forth in claim 1 wherein said electrical power source is a direct current (DC) source.

3. The system set forth in claim 2 wherein said predetermined initial period of time includes a predetermined number of zero crossings.

4. The system set forth in claim 3 wherein said means for controlling said interrupting means includes means for counting said zero crossings and means for determining whether the number of zero crossings fall within predetermined parameters thereby ascertaining whether the load is inductive, resistive or arcing.

5. The system set forth in claim 1 wherein said electrical power source is an alternating current (AC) source and further includes high pass filter means capable of filtering only the A.C. fundamental and harmonics of the alternating power source, said high pass filter means being connected to said means for sensing and digitally sampling the ringing and noise current drawn by each of said at least one load so that the initial ringing or noise riding over said sensed electrical current is extracted, sensed, sampled, and compared by said means for comparing.

6. The system set forth in claim 5 wherein said pre-established references include a predetermined number of zero crossings over said predetermined initial period of time.

7. The system set forth in claim 6 wherein said means for controlling said interrupting means includes means for counting said zero crossings and means for determining whether the number of zero crossings fall within predetermined parameters thereby ascertaining the type of load as inductive, resistive or arcing.

8. The system set forth in claim 2 wherein said established references include predetermined values for a rise time over said predetermined initial period.

9. The system set forth in claim 5 wherein said established references include predetermined values for a rise time over said predetermined initial period.

10. A method for distributing electrical power and protecting at least one load including the steps of:
   A) providing a connection of an electrical power source to at least one load;
   B) sensing and digitally sampling the ringing and noise current from a current drawn by said at least one load over a predetermined initial period of time;
   C) comparing the time domain characteristics of said sensed and digitally sampled ringing and noise current over said predetermined initial period of time against pre-established references to determine the impedance characteristics of said at least one load;
   D) generating a distinct signal based on said impedance characteristics; and
   E) interrupting the connection of said power source to said at least one load when at least one condition is violated and said condition is determined, at least in part, in response to said distinct signal.

11. The method set forth in claim 10 wherein said distinct signal is generated responding to a number of zero crossings of said ringing and noise current over an initial predetermined period of time.

* * * * *